March 21, 1939.  J. SOSS  2,151,240
COVERED JOINT HINGE
Filed March 17, 1937
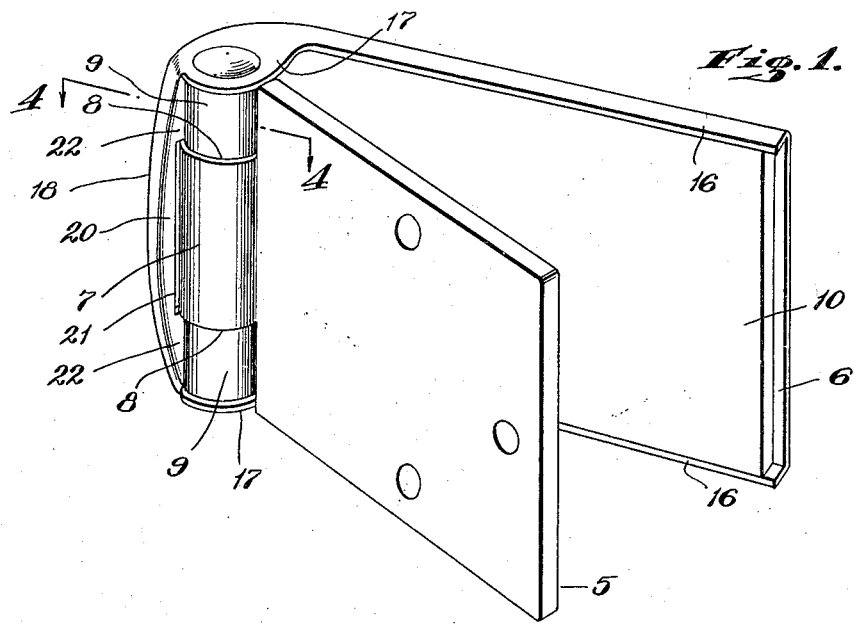
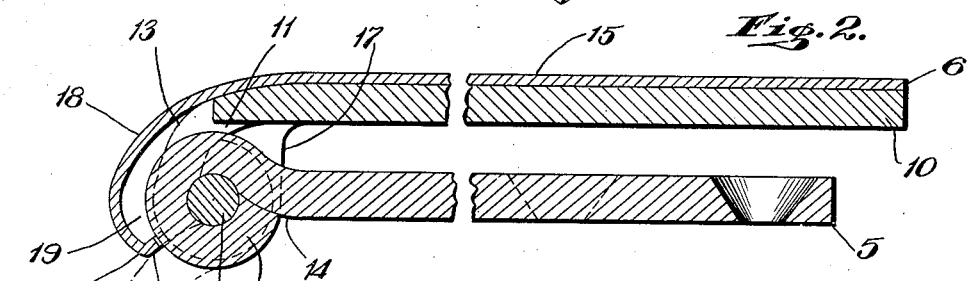
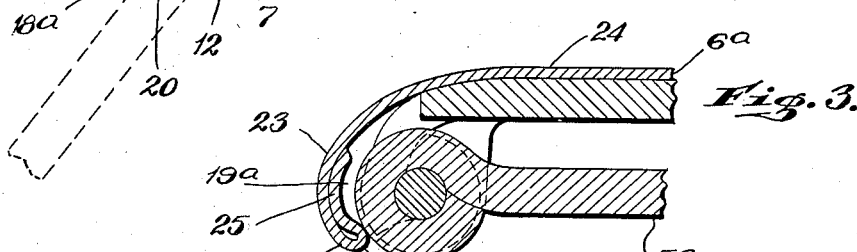
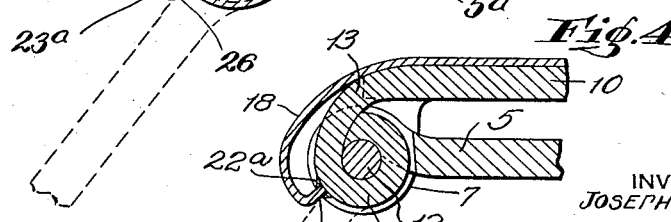
INVENTOR
JOSEPH SOSS
BY
ATTORNEY Patented Mar. 21, 1939

2,151,240

UNITED STATES PATENT OFFICE 2,151,240

COVERED JOINT HINGE

Joseph Soss, Roselle, N. J.

Application March 17, 1937, Serial No. 131,307

2 Claims. (Cl. 16—148)

This invention relates to hinges and particularly to devices of this kind designed for use in conjunction with motor vehicles in the hanging of the doors of such vehicles, and still more particularly to what are known as covered joint hinges; and the object of the invention is to provide a hinge of the class described, one of the butts of which is composed of a relatively thick part including a curled knuckle or knuckles forming pintle bearings at one end of the butt part and a thin shell part arranged upon and substantially concealing the first part and forming the curved hood concealing or substantially concealing the joint of the hinge, and especially in the formation of an inturned finishing flange at the outer free end of the curved hood portion for the purpose of reinforcing and strengthening said edge portion and at the same time providing means for closing the opening between the edge of the hood portion and the adjacent pintle bearing or bearings of the butt parts so as to produce a neater and more finished appearance and prevent to a large degree the collection of dust and dirt between the hood and the bearings disposed inwardly of the hood; a further object being to provide the curved hood portion of the outer or shell part with a flange which in addition to turning inwardly also extends backwardly along the inner surface of the curved hood part to further aid in the reinforcement of the hood part and to give added strength and rigidity to the complete hinge; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a perspective view of one form of hinge made according to my invention.

Fig. 2 is a sectional view of the structure shown in Fig. 1 with parts in a different position and on an enlarged scale.

Fig. 3 is a view similar to Fig. 2 showing a slight modification; and, Fig. 4 is a partial section on the line 4—4 of Fig. 1 with the butts in closed position to illustrate the permanent attachment of the hood flange to the butt bearing.

In Figs. 1 and 2 of the drawing, I have shown at 5 and 6 the separate butts of what is known as a covered joint hinge of the type such as disclosed in my prior Patent #1,484,343. The butt 5 consists of a single part, preferably of sheet metal, fashioned centrally of one end to form a curled cylindrical pintle bearing 7 with recesses 8 at upper and lower surfaces thereof to receive correspondingly curled pintle bearings 9 on the inner heavy sheet metal part 10 of the butt 6. The part 10 is cut out to form a recess 11 between the spaced bearings 9 to receive the bearing 7 and a pintle pin 12 is passed through all of the bearings 7, 9 to join the butt parts 5 and 6.

The pintle end portion of the part 10 is curved or offset as seen at 13 to give the desired throw or to provide the desired offset of the pintle with respect to the attaching plate portion of the part 10 to satisfy the particular requirements of any installation which varies in the different throws of a door as well as in the variance of the contour of doors of motor vehicles of the various types. In this connection, the butt part 5 may also be curved or offset as indicated at 14 to suit other similar requirements in the spacing of the attaching plates of the respective butts one from the other.

At this time, it will also be apparent that in so far as the parts 5 and 10 are concerned, these parts may be formed and constructed in any desired manner and need not be of the specific arrangement herein disclosed nor of the materials herein specifically defined.

Arranged upon the part 10 of the butt 6 is an outer shell 15, preferably composed of thin sheet metal and including top and bottom flanges 16 which overlie the upper and lower edges of the part 10 and which are enlarged at the outer end of the butt 6 to form top and bottom bearing plates 17 which conceal the upper and lower edges of the hinge; and continuous with the top and bottom plate 17 and with the outer end of the face plate of the shell 15 is an outwardly extending curved hood portion 18 which extends around and conceals or substantially conceals the knuckles or bearings 7, 9 of the hinge in viewing the hinge externally. The hood portion 18 is curved not only to envelop the bearings but also curved in the vertical plane as clearly seen in Fig. 1 of the drawing to give greater strength to this hood portion. The curvatures of the hood portion 18 provide a relatively large space 19 between the bearings 7, 9 and the inner surface of the hood portion, especially at the central part of the hood portion, due to the vertical curvature thereof. With this type of hinge of conventional construction, a large opening was formed between the hood and the bearings, in which dust and dirt would collect to interfere with the proper operation of the hinge as well as to reduce the life thereof. Still further, the large opening formed between the parts would form a whistling sound, especially when a vehicle is travelling at relatively high speed, and this whistling sound is objectionable. Still further, the free end portion of the hood in the normal or conventional construction was weak and not capable of sustaining the blows to which hinges of this type are subjected at times in the assemblage thereof and especially by careless workmen.

To overcome these objectionable features, it is the purpose of my invention to provide a means for reinforcing the free edge of the hood portion and to close the opening at the free edge thereof. While this may be done by a separate part or member secured in position, it is preferred that the free end portion 18a of the hood 18 be extended sufficiently to form a flange 20 and to bend this flange inwardly in a direction substantially radial to the axis of the pintle 12 so as to close the opening 19 and to reinforce and strengthen said free end 18a of the hood. With a hinge of the structure shown, where the bearing 7 is slightly larger in diameter than the bearings 9, I also recess the flange 20 centrally thereof as seen at 21 to provide for the enlargement of the bearing 7 and also to provide slight clearance, permitting free swinging movement of the butt 5 without any scraping effect upon the outer surface of the bearing 7. Whereas, the ends 22 of the flanges may be brought into snug or firm contact with the fixed or non-movable bearings 9, and if desired, may be secured or even welded thereto, for example as by the welding illustrated in Fig. 4 at 22a. Thus, the flange or extension 20 forms a strong reinforcement for the free end 18a of the hood 18 in addition to producing the closure for the opening 19.

In Fig. 3 of the drawing, I have shown a slight modification wherein the hood portion 23 of a shell 24 similar to the shell 15 has a longer extending part or flange 25 at the free end 23a of the hood portion 23, especially at the position intermediate the bearings similar to the bearings 9 or in registering position with the bearing similar to the bearing 7 of the structure shown in Figs. 1 and 2. In addition to forming the substantially radial projection and closure 26 which would be similar to the flange 20, the part 25 extends inwardly upon the inner surface of the hood portion 23 and may, if desired, be welded or secured to said surface within the chamber 18a as long as sufficient clearance is provided to permit free swinging movement of the butt part 5a in the butt part 6a. Aside from the difference in structure above described, the construction shown in Fig. 3 will be the same as that shown in Figs. 1 and 2, and may be made in the manners heretofore described.

In some types of hinges of the class described, the top and bottom walls 17 of the shell are extended longitudinally of the attaching plate portions of the respective butt parts so as to conceal and cover both butt parts employed in the manner taught in my prior Patents No. 1,606,048 and No. 2,023,249, and it is not deemed essential to show such adaptations and uses of the present invention in these different types of construction.

Having fully described my invention, what I claim as new and desire to secure by Letters Patent, is:

1. In a covered joint hinge employing two butt members having interengaging pintle bearings at one end thereof with a pintle arranged in said bearings for pivotally coupling said butt members, a thin walled shell mounted upon and secured to one of said butt members and including a curved hood portion partially encircling said pintle bearings and arranged in spaced relation thereto, the free edge of said curved hood portion terminating in an inwardly and radially extending flange for closing the space between said hood portion and bearings throughout the length of said bearings at said edge of the hood portion, and the end of said flange being arranged in abutting relation to the pintle bearing of the butt to which said shell is attached and having a slight clearance with the pintle bearing of the other butt member.

2. In a covered joint hinge employing two butt members having interengaging pintle bearings at one end thereof with a pintle arranged in said bearings for pivotally coupling said butt members, the bearings of one butt member being disposed at upper and lower edges thereof and the bearing of the other butt member being arranged intermediate said first named bearings, a thin walled shell mounted upon and secured to the first named butt member and including a curved hood portion partially encircling all of said pintle bearings and arranged in spaced relation thereto, the free edge of said curved hood portion terminating in an inwardly and radially extending flange for closing the space between said hood portion and bearings throughout the length of said bearings at said edge of the hood portion, and the end of that portion of the flange adjacent the bearings of the first named butt being arranged in abutting relation thereto and permanently attached to said bearings, and the end of said flange registering with the bearing of the second named butt having a slight clearance therewith.

JOSEPH SOSS.